(12) United States Patent
Gebre et al.

(10) Patent No.: US 11,657,265 B2
(45) Date of Patent: May 23, 2023

(54) TRAINING FIRST AND SECOND NEURAL NETWORK MODELS (71) Applicant: KONINKLIJKE PHILIPS N.V., Eindhoven (NL)

(72) Inventors: Binyam Gebre, Den Bosch (NL); Erik Bresch, Eindhoven (NL); Dimitrios Mavroeidis, Eindhoven (NL); Teun van den Heuvel, Eindhoven (NL); Ulf Grossekathöfer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1136 days.

(21) Appl. No.: 16/191,542

(22) Filed: Nov. 15, 2018

(65) Prior Publication Data
US 2019/0156205 A1 May 23, 2019

Related U.S. Application Data (60) Provisional application No. 62/588,542, filed on Nov. 20, 2017.

(51) Int. Cl.
*G06N 3/08* (2023.01)
*G06N 3/04* (2023.01)
(52) U.S. Cl.
CPC .............. *G06N 3/08* (2013.01); *G06N 3/0454* (2013.01); *G06N 3/0481* (2013.01)
(58) Field of Classification Search
CPC ................................ G06N 3/08; G06N 3/0454
See application file for complete search history.

(56) References Cited

U.S. PATENT DOCUMENTS

| 5,195,169 | A | * | 3/1993 | Kamiya | G06N 20/00 706/25 |
| 5,430,829 | A | * | 7/1995 | Takatori | G06N 3/082 706/25 |
| 9,542,621 | B2 | | 1/2017 | He et al. | |
| 2011/0144480 | A1 | | 6/2011 | Lu et al. | |
| 2012/0002855 | A1 | | 1/2012 | Bai | |
| 2015/0100530 | A1 | | 4/2015 | Mnih et al. | |

(Continued)

FOREIGN PATENT DOCUMENTS

JP 2017004142 A 1/2017

OTHER PUBLICATIONS

Go et. al., "Multigradient: A New Neural Network Learning Algorithm for Pattern Classification", May 2001 (Year: 2001).*

(Continued)

*Primary Examiner* — Omar F Fernandez Rivas
*Assistant Examiner* — Selene A. Haedi (57) ABSTRACT Described herein are systems and methods for training first and second neural network models. A system comprises a memory comprising instruction data representing a set of instructions and a processor configured to communicate with the memory and to execute the set of instructions. The set of instructions, when executed by the processor, cause the processor to set a weight in the second model based on a corresponding weight in the first model, train the second model on a first dataset, wherein the training comprises updating the weight in the second model and adjust the corresponding weight in the first model based on the updated weight in the second model.

20 Claims, 4 Drawing Sheets (56) References Cited

U.S. PATENT DOCUMENTS

| | | | |
|---|---|---|---|
| 2017/0024641 A1 | 1/2017 | Wierzynski | |
| 2017/0083829 A1* | 3/2017 | Kang | G06N 3/0454 |
| 2017/0132528 A1 | 5/2017 | Aslan et al. | |
| 2017/0169314 A1* | 6/2017 | Dijkman | G06K 9/6261 |
| 2017/0278018 A1* | 9/2017 | Mnih | G06N 3/08 |
| 2018/0349788 A1* | 12/2018 | Sarkar | G06N 3/08 |
| 2018/0350069 A1* | 12/2018 | Nakano | G06V 10/7788 |
| 2019/0122078 A1* | 4/2019 | Ura | G06N 20/10 |
| 2019/0130277 A1* | 5/2019 | Andoni | G06N 3/084 |

OTHER PUBLICATIONS

Islam et. al., "A Constructive Algorithm for Training Cooperative Neural Network Ensembles", 2003 (Year: 2003).*

Zhou et. al, "Automatic organ segmentation on torso CT images by using content-based image retrieval", 2012 (Year: 2012).*

Chen et. al. "Diagnosis of Breast Tumors with Sonographic Texture Analysis Using Wavelet Transform and Neural Networks", 2002 (Year: 2002).*

Kabir et. al. "A New Wrapper Feature Selection Approach using Neural Network", 2010 (Year: 2010).*

Smith, J.R., "Investigation of how neural networks learn from the experiences of peers through periodic weight averaging". (2017) Theses and Dissertations. http://scholarworks.uark.edu/etd/1877.

Teichmann, M. et al., "Multinet: real-time joint semantic reasoning for autonomous driving". Published in IEEE Intelligent Vehicles Symposium (IV) 2018: 10.1109/IVS.2018.8500504.

Shao, Y. et al., "Comparison of Early Stopping Criteria for Neural-Network-Based Subpixel Classification". IEEE Geoscience and Remote Sensing Letters, vol. 8, No. 1, Jan. 2011.

Zhang, et al., "Deep Model Based Transfer and Multi-Task Learning for Biological Image Analysis", 20 pages (Abstract).

L.Y. Pratt, "Non-literal Transfer Among Neural Network Learners", Department of Mathematical and Computer Sciences, Jan. 7, 1993, pp. 1-25.

Pratt, et al., "Direct Transfer of Learned Information Among Neural Networks", From: AAAI-91 Proceedings, Connectionist Representations, pp. 584-589.

* cited by examiner

TRAINING FIRST AND SECOND NEURAL NETWORK MODELS

CROSS-REFERENCE TO RELATED APPLICATION

The present application claims priority to and the benefit of U.S. Provisional Application No. 62/588,542, filed Nov. 20, 2017, which is hereby incorporated by reference in its entirety.

TECHNICAL FIELD

Various embodiments described herein relate to the field of machine learning. More specifically, various embodiments relate to a system and method for training first and second neural network models.

BACKGROUND

The general background is in machine learning. Machine learning models can be used to classify large amounts of data in an automated fashion. Machine learning can be particularly useful when classifying images such as medical images which could otherwise only be classified by highly skilled individuals. Two examples where machine learning can speed up medical image classification is in the field of stent markers. In particular it can be helpful for machine learning models to be developed that are capable of detecting a stent in an image and/or producing the co-ordinates of end points (e.g. balloon markers) in an image of a stent.

One class of machine learning models is artificial neural networks (or neural networks). To teach neural networks to perform a task, it is known that three challenges have to be overcome. Firstly lots of annotated training data is required to train the neural network accurately; generally the more training data that is available, the more accurate the resulting model. Furthermore, even when annotated training data is available, the annotations may not be directly suitable for training a particular model. This can require entirely new sets of training data to be produced for each model. Secondly, enough computation time must be procured to allow the network to process the training data (e.g. be trained) until the weights of the neural network converge towards the optimal value. Thirdly, a search must be performed in parameter and architecture space to find a neural network architecture that is optimal for a given task.

It can thus be time consuming and expensive to procure suitable training data sets, work out a suitable neural network architecture and train a model to a required accuracy.

There is therefore a need for methods and systems to improve the above-mentioned problems.

SUMMARY

These and other aspects will be apparent from and elucidated with reference to the embodiments described hereinafter.

According to a first aspect, there is a system configured for training first and second neural network models. The system comprises a memory comprising instruction data representing a set of instructions and a processor configured to communicate with the memory and to execute the set of instructions. The set of instructions, when executed by the processor, cause the processor to set a weight in the second model based on a corresponding weight in the first model; train the second model on a first dataset, wherein the training comprises updating the weight in the second model; and adjust the corresponding weight in the first model based on the updated weight in the second model.

In this way, the weights of the first and second models can be shared and/or updated in a back-and-forth manner every time one of the models receives additional training. Thus, training of the second model benefits and improves the weights of the first model, without the first model (necessarily) having to process and be trained on the first dataset directly, and vice versa. This can be particularly beneficial if the models are classifying the same, or similar types of data (e.g. if each model is classifying a different part of a particular type of medical image data) where the weights of lower layers of each model might be expected to converge (towards the optimal values for each weight) over time. This method requires less computational power and less training time as the training only need take place on one of the models, as opposed to both models.

The systems and methods herein are well suited, for example, where medical data collected for a specific task is not enough on its own (e.g. there isn't enough training data for a particular training problem), or where artificial data augmentation (e.g. simulated data) is not possible or is limited, for example because the natural variations of the data are not fully captured by the data augmentation. The system and methods herein may also be well suited, for example, where, despite there being data shortages of some types of data, additional medical data collected and annotated for other related tasks is available. For example, the same type of images comprising different annotations. Even if there is enough data for some task, there is still benefit to be gained in training using a "back and forth" transfer of weights as described herein, as the models may reach training convergence much more quickly, using less overall computing power.

In some embodiments the weight comprises a weight in one of: an input layer of the second model and a hidden layer of the second model.

In some embodiments causing the processor to adjust the corresponding weight in the first model comprises causing the processor to copy a value of the weight from the second model to the corresponding weight in the first model.

In some embodiments causing the processor to adjust the corresponding weight in the first model comprises causing the processor to apply an increment to a value of the corresponding weight in the first model, based on the difference between the corresponding weight in the first model and the weight in the second model.

In some embodiments causing the processor to adjust the corresponding weight in the first model further comprises causing the processor to set a weight in an output layer of the first model to an arbitrary value.

In some embodiments causing the processor to adjust the corresponding weight in the first model further comprises causing the processor to maintain a value of at least one weight in an output layer of the first model at the same value.

In some embodiments causing the processor to set a weight in the second model comprises causing the processor to copy a value of a weight from one of: an input layer of the first model and a hidden layer of the first model, to a corresponding weight in the second model.

In some embodiments causing the processor to set a weight in the second model further comprises causing the processor to set at least one weight in an output layer of the second model to an arbitrary value.

In some embodiments the first model comprises one of: an object detection model and an object localisation model. In some embodiments, the second model comprises the other one of: an object detection model and an object localisation model.

In some embodiments the first model comprises one of: a model configured to produce a single output and a model configured to produce a plurality of outputs. In some embodiments the second model comprises the other one of: a model configured to produce a single output and a model configured to produce a plurality of outputs.

In some embodiments the set of instructions, when executed by the processor, further cause the processor to adjust a weight in one of: the first model and the second model, in response to further training of the other one of: the first model and the second model.

In some embodiments the set of instructions, when executed by the processor, cause the processor to repeat the step of adjusting a weight, until one or more of the following criteria are met: i) the first model and/or the second model reach a threshold accuracy level ii) the magnitude of an adjustment falls below a threshold magnitude iii) said weight in the first model and its corresponding weight in the second model converge towards one another within a predefined threshold and iv) a loss associated with the first model and/or a loss associated with the second model changes by less than a threshold amount between subsequent adjustments.

In some embodiments the first model is trained on a second dataset, the first dataset comprising less data than the second dataset, wherein the size of the second dataset alone is insufficient to train the second model to a predefined accuracy with arbitrarily initiated weights.

According to a second aspect there is a computer implemented method of training first and second neural network models, the method comprising: setting a weight in the second model based on a corresponding weight in the first model, training the second model on a dataset, wherein the training comprises updating the weight in the second model and adjusting the corresponding weight in the first model based on the updated weight in the second model.

According to a third aspect, there is a computer program product comprising a non-transitory computer readable medium, the computer readable medium having computer readable code embodied therein, the computer readable code being configured such that, on execution by a suitable computer or processor, the computer or processor is caused to perform the method of any of the embodiments described herein.

BRIEF DESCRIPTION OF THE DRAWINGS

For a better understanding of the embodiments, and to show more clearly how they may be carried into effect, reference will now be made, by way of example only, to the accompanying drawings, in which.

DETAILED DESCRIPTION OF EMBODIMENTS

As noted above, there is provided an improved method and system for training first and second neural network models, which overcomes some of the existing problems.

Figure 1:
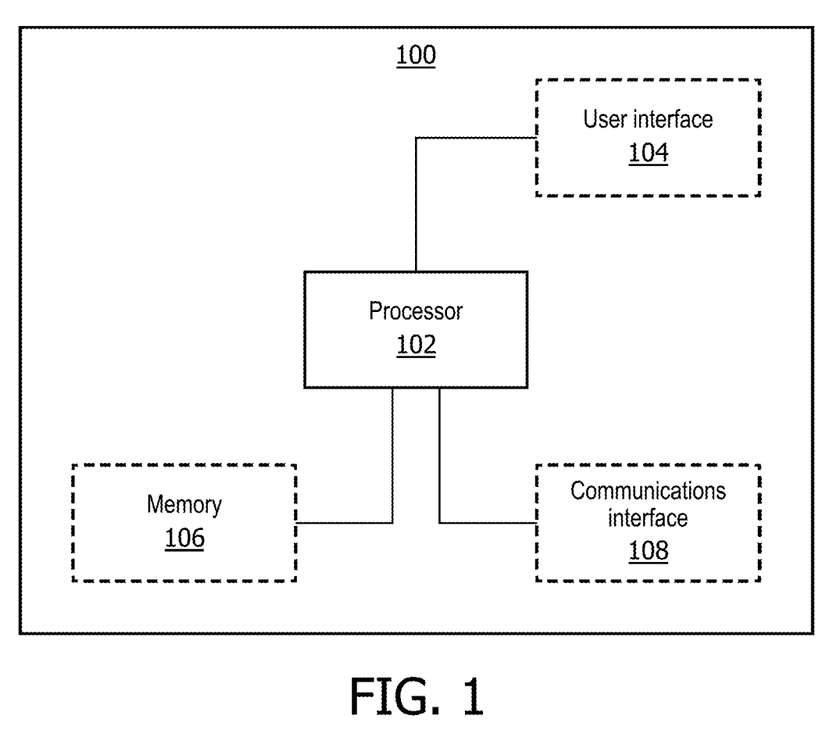
FIG. 1 illustrates an example system for training first and second neural network models according to an embodiment.

FIG. 1 shows a block diagram of a system 100 according to an embodiment that can be used for training a neural network model. With reference to FIG. 1, the system 100 comprises a processor 102 that controls the operation of the system 100 and that can implement the method described herein.

The system 100 further comprises a memory 106 comprising instruction data representing a set of instructions. The memory 106 may be configured to store the instruction data in the form of program code that can be executed by the processor 102 to perform the method described herein. In some implementations, the instruction data can comprise a plurality of software and/or hardware modules that are each configured to perform, or are for performing, individual or multiple steps of the method described herein. In some embodiments, the memory 106 may be part of a device that also comprises one or more other components of the system 100 (for example, the processor 102 and/or one or more other components of the system 100). In alternative embodiments, the memory 106 may be part of a separate device to the other components of the system 100.

In some embodiments, the memory 106 may comprise a plurality of sub-memories, each sub-memory being capable of storing a piece of instruction data. In some embodiments where the memory 106 comprises a plurality of sub-memories, instruction data representing the set of instructions may be stored at a single sub-memory. In other embodiments where the memory 106 comprises a plurality of sub-memories, instruction data representing the set of instructions may be stored at multiple sub-memories. For example, at least one sub-memory may store instruction data representing at least one instruction of the set of instructions, while at least one other sub-memory may store instruction data representing at least one other instruction of the set of instructions. Thus, according to some embodiments, the instruction data representing different instructions may be stored at one or more different locations in the system 100. In some embodiments, the memory 106 may be used to store information, data (e.g. images), signals and measurements acquired or made by the processor 102 of the system 100 or from any other components of the system 100.

The processor 102 of the system 100 can be configured to communicate with the memory 106 to execute the set of instructions. The set of instructions, when executed by the processor 102 may cause the processor 102 to perform the method described herein. The processor 102 can comprise one or more processors, processing units, multi-core processors and/or modules that are configured or programmed to control the system 100 in the manner described herein. In some implementations, for example, the processor 102 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different steps and/or different parts of a single step of the method described herein.

Returning again to FIG. 1, in some embodiments, the system 100 may comprise at least one user interface 104. In some embodiments, the user interface 104 may be part of a device that also comprises one or more other components of the system 100 (for example, the processor 102, the memory 106 and/or one or more other components of the system 100). In alternative embodiments, the user interface 104 may be part of a separate device to the other components of the system 100.

A user interface 104 may be for use in providing a user of the system 100 (for example, a researcher such as a medical researcher, a medical professional, or any other user of a neural network model) with information resulting from the method according to embodiments herein. The set of instructions, when executed by the processor 102 may cause processor 102 to control one or more user interfaces 104 to provide information resulting from the method according to embodiments herein. Alternatively or in addition, a user interface 104 may be configured to receive a user input. In other words, a user interface 104 may allow a user of the system 100 to manually enter instructions, data, or information. The set of instructions, when executed by the processor 102 may cause processor 102 to acquire the user input from one or more user interfaces 104.

A user interface 104 may be any user interface that enables rendering (or output or display) of information, data or signals to a user of the system 100. Alternatively or in addition, a user interface 104 may be any user interface that enables a user of the system 100 to provide a user input, interact with and/or control the system 100. For example, the user interface 104 may comprise one or more switches, one or more buttons, a keypad, a keyboard, a mouse, a mouse wheel, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, as illustrated in FIG. 1, the system 100 may also comprise a communications interface (or circuitry) 108 for enabling the system 100 to communicate with interfaces, memories and/or devices that are part of the system 100. The communications interface 108 may communicate with any interfaces, memories and devices wirelessly or via a wired connection.

It will be appreciated that FIG. 1 only shows the components required to illustrate this aspect of the disclosure and, in a practical implementation, the system 100 may comprise additional components to those shown. For example, the system 100 may comprise a battery or other power supply for powering the system 100 or means for connecting the system 100 to a mains power supply.

In more detail, as noted above, the system is configured for training first and second neural network models. The memory 106 comprises instruction data representing a set of instructions. Briefly, the set of instructions, when executed by the processor 102 of the system 100 cause the processor 102 to set a weight in the second model based on a corresponding weight in the first model, train the second model on a first dataset, wherein the training comprises updating the weight in the second model, and adjust the corresponding weight in the first model based on the updated weight in the second model.

As noted briefly above, the system herein is based on the realisation that when two neural network models are trained to classify similar types of data (e.g. such as the same types of images), even if the output of the models is different (e.g. one model may be trained to detect the presence of a particular object in an image, whilst the other is trained to measure the length of a particular type of object in an image) the weights in some layers of the models are often very similar and may even converge to the same values if the models are trained on sufficiently large databases of training data. Therefore, if a second model receives training, the updated weights from this training can be used to improve the weights of a first model, without any further training needing to be applied to the first model directly. In this way, duplicated training of similar models can be reduced thus making the training process more efficient and this therefore leads to training convergence (e.g. to the weights of the model moving towards the optimal value for each weight) much faster than would otherwise be possible. Additionally, less training data is required for each model (e.g. remote databases used to train the second model do not have to be made available directly to the first model) and computational power is saved, because only one of the models has to process each new batch of training data, rather than each model having to process it individually.

Artificial neural networks or, simply, neural networks, will be familiar to those skilled in the art, but in brief, a neural network is a type of model that can be used to classify data (for example, classify, or identify the contents of image data). The structure of a neural network is inspired by the human brain. Neural networks are comprised of layers, each layer comprising a plurality of neurons. Each neuron comprises a mathematical operation. In the process of classifying a portion of data, the mathematical operation of each neuron is performed on the portion of data to produce a numerical output, and the outputs of each layer in the neural network are fed into the next layer sequentially. Generally, the mathematical operations associated with each neuron comprise one or more weights that are tuned during the training process (e.g. the values of the weights are updated during the training process to tune the model to produce more accurate classifications).

For example, in a neural network model for classifying the contents of images, each neuron in the neural network may comprise a mathematical operation comprising a weighted linear sum of the pixel (or in three dimensions, voxel) values in the image followed by a non-linear transformation. Examples of non-linear transformations used in neural networks include sigmoid functions, the hyperbolic tangent function and the rectified linear function. The neurons in each layer of the neural network generally comprise a different weighted combination of a single type of transformation (e.g. the same type of transformation, sigmoid etc. but with different weightings). As will be familiar to the skilled person, in some layers, the same weights may be applied by each neuron in the linear sum; this applies, for example, in the case of a convolution layer. The weights associated with each neuron may make certain features more prominent (or conversely less prominent) in the classification process than other features and thus adjusting the weights of neurons in the training process trains the neural network to place increased significance on specific features when classifying an image. Generally, neural networks may have weights associated with neurons and/or weights between neurons (e.g. that modify data values passing between neurons).

As briefly noted above, in some neural networks, such as convolutional neural networks, lower layers such as input or hidden layers in the neural network (i.e. layers towards the beginning of the series of layers in the neural network) are activated by (i.e. their output depends on) small features or patterns in the portion of data being classified, while higher layers (i.e. layers towards the end of the series of layers in the neural network) are activated by increasingly larger features in the portion of data being classified. As an example, where the data comprises an image, lower layers in the neural network are activated by small features (e.g. such as edge patterns in the image), mid-level layers are activated by features in the image, such as, for example, larger shapes and forms, whilst the layers closest to the output (e.g. the upper layers) are activated by entire objects in the image.

In general, the weights of the final layers of a neural network model (known as the output layers) are most strongly dependent on the particular classification problem being solved by the neural network. For example, the weights of outer layers may heavily depend on whether the classification problem is a localisation problem or a detection problem. The weights of lower layers (e.g. input and/or hidden layers) tend to depend on the contents (e.g. features) of the data being classified and therefore it has been recognised herein that the weights in input and hidden layers of neural networks processing the same type of data may, with enough training, converge towards the same values over time, even if the outer layers of the models are tuned to address different classification problems.

Generally, the systems and methods described herein relate to training first and second neural network models (referred to herein as the first and second models respectively). The first and second models may comprise weights (e.g. parameters) that are updated (e.g. adjusted) as part of the training processes of the first and second models. Generally, the first neural network model and the second neural network model may comprise feed forward models (such as convolutional neural networks, autoencoder neural network models, probabilistic neural network models and time delay neural network models), radial basis function network models, recurrent neural network models (such as fully recurrent models, Hopfield models, or Boltzmann machine models), or any other type of neural network model comprising weights.

The first and second models may be used to classify data. The data may be any type of data, such as data comprising images (e.g. image data), data comprising text such as documents or records, audio data or any other type of data that can be classified by first and second neural network models. In some embodiments, the data comprises medical data, such as medical images (e.g. x-ray images, ultrasound images, etc.) or medical records.

In some embodiments, the first and second models may be trained to produce one or more classifications (e.g. labels) for data. In some embodiments, the first and second models are trained to classify (e.g. process and produce a label for) the same type of data. For example, both the first model and the second model may be used to classify imaging data, such as medical imaging data. In some embodiments, the first and second models may be used to classify the same type of imaging data, for example, the first and second models may both be used to classify medical imaging data of a particular anatomical structure such as the vascular system, heart, or any other anatomical structure.

In some embodiments, the first model and the second model may produce the same type of classifications (for example, both the first model and the second model may annotate data in the same way, or be used to solve the same problem). In some embodiments, the first model may be used to produce different classifications (for example, the first model may be used to produce a different type of annotation to the second model, or be used to solve a different problem).

Figure 2:
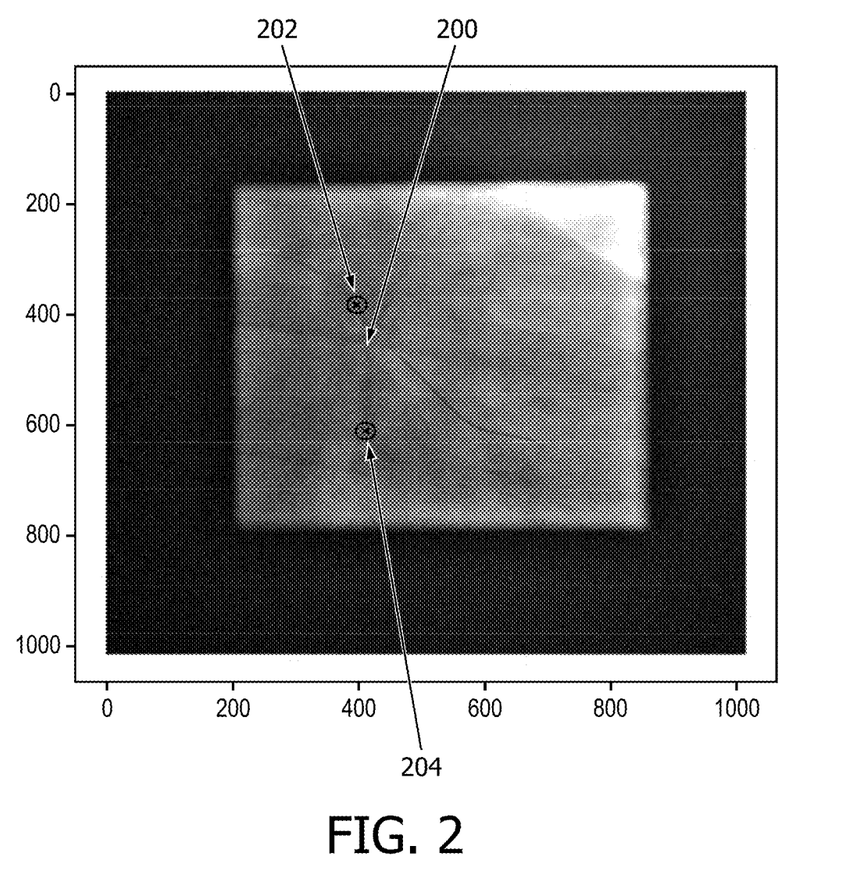
FIG. 2 illustrates an embodiment wherein the first and second models are used to produce classifications for medical images comprising stents.

For example, in some embodiments, the first model may be used to detect the presence of an object in an image. In some embodiments, the second model may be used to identify the location of an object in an image. An example image comprising a stent is shown in FIG. 2 which shows a stent 200, either end of which is marked by two balloon markers 202 and 204. In some embodiments, the first model may be trained to process images such as that shown in FIG. 2 and produce an output indicating whether a stent is present in a medical image (e.g. a stent detection model). In this embodiment, the output layer of the first model may have two neurons suitable for binary output, for example, the first model may output that a stent is present, or that a stent is not present in an image. In some embodiments, the second model may also be trained to process data such as the data shown in FIG. 2, but the second model may be trained to produce a different output. For example, the output layer of the second model may comprise four neurons, the first pair corresponding to the x-y coordinates of the centre of a bounding box surrounding the stent and the second pair corresponding to the width and height of the bounding box. In this way, the location of the stent can be output for each medical image. It will be appreciated that these are merely examples however and that the output layers of the first and second models may comprise other numbers of neurons that produce different outputs. For example, for example, instead of producing co-ordinates and dimensions of a bounding box, the second model may be trained to output the x,y co-ordinates of one or both ends of the stent (e.g. the balloon markers 202, 204) in the image.

In more general terms, therefore, in some embodiments, the first model comprises one of: an object detection model and an object localisation model, and the second model comprises the other one of: an object detection model and an object localisation model. In this way, the first model and the second model may perform classification operations that are related or similar enough to share information (e.g. weights derived through training) between the first and second models.

Alternatively or additionally, in some embodiments, the first model may comprise one of: a model configured to produce a single output; and a model configured to produce a plurality of outputs (e.g. a model configured to produce a single output parameter or classification or a model configured to produce multiple output parameters or classifications). The second model may then comprise the other one of: a model configured to produce a single output and a model configured to produce a plurality of outputs. Thus, the first model and the second model may be performing classification operations that are related or similar enough to share information (e.g. weights derived through training) between the first and second models. Applying the systems and methods herein to these types of models means that network weights and biases are shared between the two tasks, leading to less memory footprint when the two tasks need to be performed on the same system.

In some embodiments, the second model may comprise a newly created (e.g. untrained) model. For example, the weights of the second model may initially be set arbitrarily or randomly.

In some embodiments, the second model may have received earlier training. In some embodiments, the second model may be considered to be a partially trained model. In this sense, "partially trained" refers to the fact that the second model may have received some training, and is therefore able to perform a classification, but that further training is required before the second model is able to classify data to within a predefined accuracy (e.g. an appropriate accuracy required by a user for a particular application). If the second model is partially trained, then the weights of the second model will not be arbitrary but will have been updated (during the earlier training process). The weights of the second model may not be optimal, however, for the classification problem being solved by the second model, and as such the second model may benefit from further training.

In some embodiments, the first model may comprise a partially trained model. As noted above, the first model may have received some training, and is therefore able to perform a classification. The weights of the first model are therefore not arbitrary, as the weights of the first model are set according to training previously received by the first model. It will be appreciated that in addition to the steps of the process described herein, (e.g. prior to setting a weight in the second model based on a corresponding weight in the first model), in some embodiments, the set of instructions, when executed by the processor 102 may cause the processor 102 to train the first model on a second training dataset.

In some embodiments, if both the first model and the second model are partially trained, the first model may have received more training (e.g. has been trained on a larger dataset) than the second model. In some embodiments, the first model is trained on a second dataset, the first dataset (available to train the second model) comprising less data than the second dataset (used to train the first model). The size of the second dataset alone may be insufficient to train the second model to a predefined accuracy with arbitrarily initiated weights.

As noted briefly above, the system 100 comprises a memory 106 comprising instruction data representing a set of instructions. The set of instructions, when executed by the processor 102 cause the processor 102 to set a weight in the second model based on a corresponding weight in the first model.

In some embodiments, causing the processor 102 to set a weight in the second model comprises causing the processor 102 to copy a value of a weight from one of: an input layer of the first model, and a hidden layer of the first model, to a corresponding weight in the second model. For example, in some embodiments, a weight (e.g. value of a weight) from an input layer of the first model may be copied to an equivalent layer in the second model. Additionally or alternatively, a weight from a hidden layer of the first model may be copied to an equivalent hidden layer in the second model. The skilled person will appreciate that more than one weight, from more than one layer (hidden and/or input layer) of the first model may be copied to equivalent weights in the second model. In this way, the weights of the second model are updated from the values of the first model, so as to improve the weights of the second model without having to perform any additional training on the second model.

In some embodiments, all of the weights of the input and hidden layers of the first model are copied to the equivalent weights of the input and hidden layers of the second model. This is particularly useful if the second model is a newly created (e.g. untrained) model, in such circumstances, setting the weights of the second model to the same values as the (partially) trained first model shortens the time needed to train the second model compared to training the weights of the second model from scratch, without any previous knowledge. Put another way, in some embodiments, all weights except for those in one or more output layers of the first model are copied across to the second model (e.g. weights from the output layers of the first model are not copied to equivalent positions in the second model), because, as noted above, the weights in the output layer of the first model are specific to the particular classification problem being addressed by the first model and are therefore not transferable to the second model, if, for example, the second model is addressing a different classification problem. The technical implication of this is that the neural network adaptation involves replacing the last (e.g. output) layer and the objective function of one neural network with a new layer and objective function suitable for another classification problem. In this way, a network trained for one task can be adapted to solve another related task, which may otherwise have been difficult to solve because the related task had either too little data for a neural network to learn from or perhaps because the best network architecture could not found in a reasonable time.

In some embodiments, causing the processor 102 to set a weight in the second model further comprises causing the processor 102 to set at least one weight in an output layer of the second model to an arbitrary value. For example, the connections to the last (e.g. output) layer of the second model may be randomly initialized and for this reason may be said to be trained from scratch whereas other weights and biases may be initialised based on the equivalent weights in the first model and subsequently fine-tuned.

After one or more weights from the first model are copied from the first model to the second model, the set of instructions, when executed by the processor 102 cause the processor 102 to train the second model on a first dataset, wherein the training comprises updating the weight (e.g. the weight copied from the first model) in the second model. For example, one or more weights copied from the first model may be updated as the second model is trained.

The skilled person will be familiar with methods for training the second model, but briefly, the first dataset may comprise examples of data (e.g. typical of the data that is to be classified by the second model) and annotations (e.g. correct classification as produced by a human) for each piece of data in the training set. The second model may then be trained by processing each piece of data in the training dataset as follows. A classification is produced for the piece of data by the second model, which is compared to its associated annotation. Weights in the model are updated according to the comparison (for example, by calculating one or more loss functions) and the process is then repeated for next piece of data in the training dataset. In this way, the weights of the model are progressively improved. The skilled person will be familiar with different methods that can be employed to train weights in neural network models, and any such methods may be employed herein.

Once the second model is trained using the first dataset, the set of instructions, when executed by the processor 102 cause the processor 102 to adjust the corresponding weight in the first model based on the updated weight in the second model. In this sense, the "updated weight" may comprise a weight in the second model that was copied from the first model and subsequently updated in the course of training the second model, as described above.

In some embodiments, causing the processor 102 to adjust the corresponding weight in the first model comprises causing the processor 102 to copy a value of the weight (e.g. the updated weight) from the second model to the corresponding weight in the first model. In this way, the first model benefits from the additional training received by the second model, without having to process (e.g. be trained on) the first set of data directly.

In some embodiments, causing the processor 102 to adjust the corresponding weight in the first model comprises causing the processor 102 to apply an increment to a value of the corresponding weight in the first model, based on the difference between the corresponding weight in the first model and the weight in the second model. For example, the corresponding weight in the first model may be adjusted by a percentage of the difference between the corresponding weight in the first model and the weight in the second model. For example, the weight may be updated by fifty percent of the difference between the corresponding weight in the first model and the weight in the second model. The skilled person will appreciate however that this is only exemplary and that any other percentage increment could equivalently be used. In this way, the additional training received by the second model may be used to improve the first model, without the first model having to process (e.g. be trained on) the first dataset directly. Furthermore, because the values of the weights of the second model are not copied directly to the first model over the values of the first model, the training of experiences of the first model are not lost. Rather, the training of the second model is used to incrementally move the weights of the first model towards the optimal solution, whilst retaining the experience gained by the first model in the first model's previous training. Adjusting values of weights between first and second models in this way further ensures that during a training process involving minimising a loss function, the weights of the model do not get stuck in a local minima of the loss function. Rather, by having two models working and being trained on the same or similar problems, the training process is more easily able to converge on the global minimum of the associated loss function(s), making the classification process more accurate.

In some embodiments, causing the processor 102 to adjust the corresponding weight in the first model further comprises causing the processor 102 to adjust a weight in an input or hidden layer of the model, based on the equivalent updated weight in the second model. In some embodiments, causing the processor 102 to adjust the corresponding weight in the first model further comprises causing the processor 102 to copy a value of a weight from one of: an input layer of the first model, and a hidden layer of the first model, to a corresponding weight in the second model. For example, one or more values of weights from one or more hidden layers of the second model may be copied to equivalent weights in the first model. Additionally or alternatively, one or more weights from one or more input layer of the second model may be copied from the second model to equivalent weights in the first model. As noted above, updates to the weights of input and hidden layers of the second model are most relevant to the first model (as opposed to output layers) as these may be common to both the first and second models.

As noted above, the output layers of a neural network model depend on the particular classification problem being solved by the model and therefore it may not be appropriate to adjust output layers of the first model based on the updated weights of the trained second model (unless the first and second models are solving the same or similar classification problems). Therefore, in some embodiments, causing the processor 102 to adjust the corresponding weight in the first model further comprises causing the processor 102 to maintain a value of at least one weight in an output layer of the first model at the same value (e.g. leave one or more weight(s) in output layer(s) of the first model unchanged). In some embodiments, causing the processor 102 to adjust the corresponding weight in the first model further comprises causing the processor 102 to set a weight in an output layer of the first model to an arbitrary value (e.g. reset one or more weights in an output layer of the first model). In this embodiment, the weights of the output layers of the first model may be trained separately.

In some embodiments, the set of instructions, when executed by the processor 102, further cause the processor 102 to adjust a weight in one of: the first model and the second model, in response to further training of the other one of: the first model and the second model. For example, if subsequent to the process outlined above, further training is performed on the first model, weights of the second model may be adjusted (in any of the ways described in any of the embodiments above), based on the further trained weights of the first model. In this way, any subsequent training of the first or second models can be used to update the weights of the other model.

In some embodiments, the set of instructions, when executed by the processor 102, cause the processor 102 to repeat the step of adjusting a weight (e.g. iteratively adjusting weights in a model according to training of the other model as described above). In some embodiments, the step of adjusting may be repeated until a desired accuracy is obtained. For example, until the first model and/or the second model reach a threshold accuracy level. The threshold accuracy may be defined in any suitable way. For example, the threshold accuracy may be defined in terms of the percentage of correct annotations produced by the first and/or second models when the first and/or second models are tested on a validation dataset. In some embodiments, the step of adjusting may be repeated until a loss function associated with the first model and/or a loss function associated with the second model changes by less than a threshold amount between subsequent adjustments. The threshold amount may be defined in any suitable way, and may, for example, comprise a threshold percentage change in the value of the loss function. The skilled person will be familiar with loss functions and how they may be used to train a neural network model. If an adjustment to a weight results in a small change in the loss of the model, then this may indicate that the accuracy of the model is approaching optimal levels (e.g. optimal for the particular classification problem). This is commonly referred to as convergence of the model (e.g. convergence of the weights of the model to the optimal values for the classification problem). The loss is usually a single number and is therefore more easily interpretable than the values of the weights in the model (for example, there may be many, possibly millions of weights). Furthermore, the loss more closely reflects the particular problem being solved by the model.

In some embodiments, the step of adjusting may be repeated until a threshold number of iterations have been reached, or a threshold amount of test data has been processed by the first and/or second model. In some embodiments, the step of adjusting may be repeated until the magnitude of an adjustment falls below a threshold magnitude (e.g. until the adjustments become small, indicating that further training will not have a significant effect on the accuracy of the model). Any suitable threshold magnitude may be used, for example, such as a threshold percentage change in the magnitude. In some embodiments, the step of adjusting may be repeated until said weight in the first model and its corresponding weight in the second model converge towards one another within a predefined threshold (e.g. indicating that the weights of the two models have converged towards the optimal values). In this sense, the weights of the first and second models move towards (e.g. reach) common values. The skilled person will appreciate that the step of adjusting may be repeated until and one, or any combination of ones of the above criteria are satisfied. In this way, the step of adjusting is repeated until an accuracy/convergence/change in loss is achieved that indicates that the model is performing (e.g. classifying) above a particular accuracy level.

As described above this efficiently trains the weights of first and second neural network models by effectively "sharing" the training experiences gained by each model with the other. The models learn from each other by copying each other's weights and fine tuning them using their own copies of training data. In this way, training from one model can be used to improve weights of another model in an iterative fashion until the weights of the models converge upon optimal values for each weight. As noted previously, adjusting values of weights between first and second models in this way ensures that during a training process involving minimising a loss function, the weights of the model do not get stuck in a local minima of the loss function. Rather, by having two models working and being trained on the same or similar problems, the training process is more easily able to converge on the global minimum of the associated loss function(s).

Figure 3:
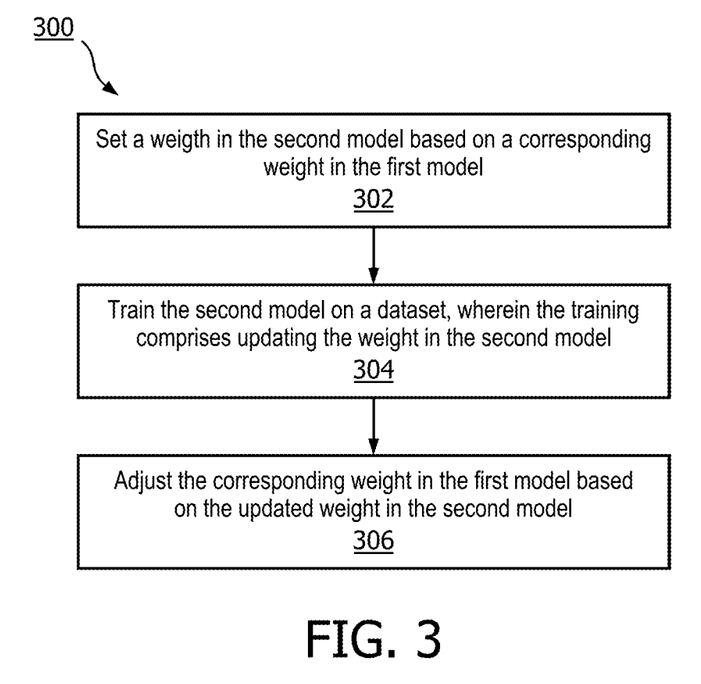
FIG. 3 illustrates a computer-implemented method of training first and second neural network models according to an embodiment.

FIG. 3 illustrates a computer-implemented method 300 for training a neural network model according to an embodiment. The illustrated method 300 can generally be performed by or under the control of the processor 102 of the system 100. The method may be partially or fully automated according to some embodiments.

The method comprises setting a weight in the second model based on a corresponding weight in the first model (in block 302), training the second model on a dataset, wherein the training comprises updating the weight in the second model (in block 304), and adjusting the corresponding weight in the first model based on the updated weight in the second model (in block 306).

In this way, as described above with respect to system 100, when first or second models receive additional training, the updated weights of the newly trained model can be used to update the weights of the other of the models. In this way, training experiences can be shared between models to enable the weights of the models to converge upon optimal values for classification. This reduces the training time for each model (compared to training each mode individually on all available data) and is more computationally effective as training can be shared without each model having to process all available training examples. Furthermore, by exchanging or updating weights back and forth in this manner, the weights are more likely to converge on a global minimum of an associated loss function, rather than local minima (which can be a problem for individual models being trained in isolation).

Figure 4:
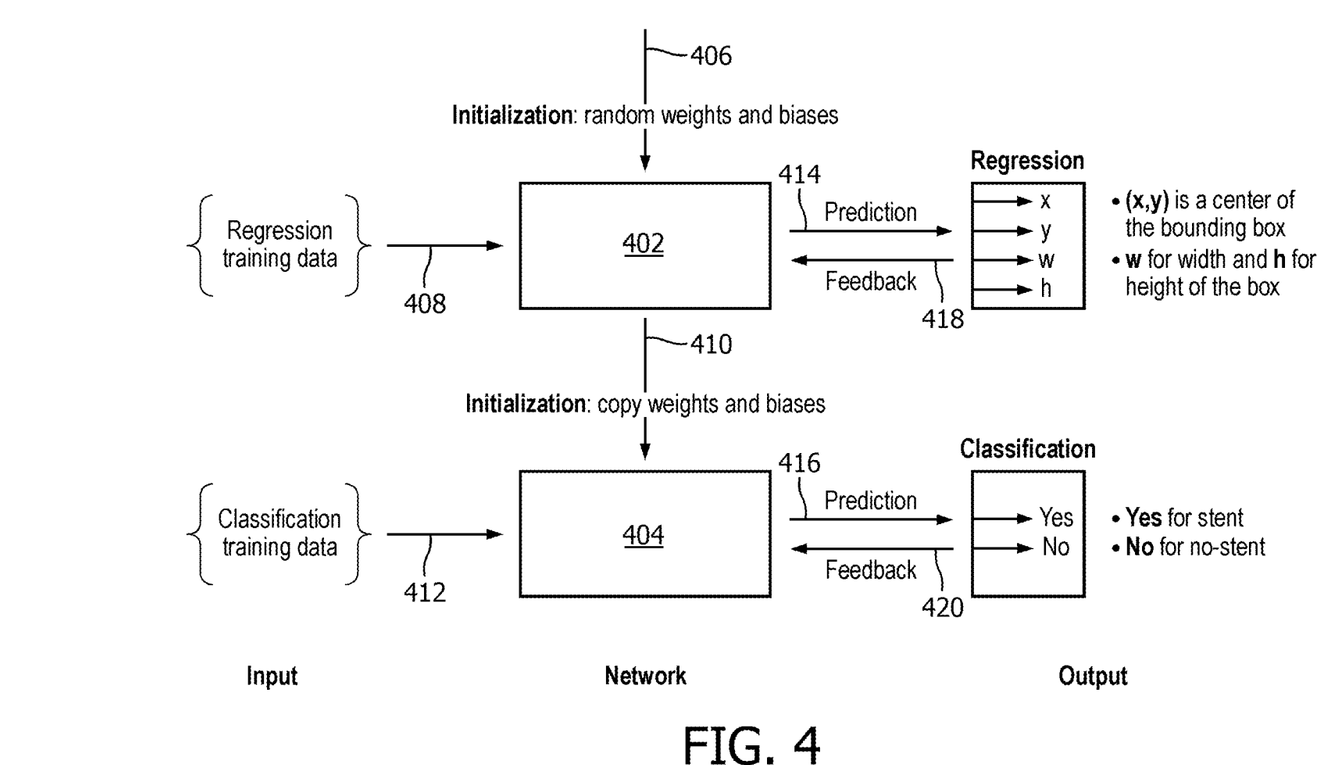
FIG. 4 illustrates a further embodiment of training first and second neural network models.

Turning to FIG. 4, FIG. 4 illustrates an example method of training first 402 and second 404 neural network models, according to an embodiment. In this embodiment, the first model 402 is trained to predict the location of a stent in an image and the second model 404 is trained to classify an image as containing a stent or not containing a stent.

In a first block 406, the method comprises initialising (e.g. instantiating) the first model with random (e.g. arbitrary) weights. The first model 402 is then trained in block 408 on a second dataset comprising training data in the form of medical images annotated (or labelled, e.g. by a human annotator) with the x,y co-ordinates of the centre of a bounding box drawn around the stent in each image. Locating a bounding box in this way is a regression problem, and therefore the second dataset may be described as regression training data. Training the first model in this way was described above with respect to system 100 and the details therein will be understood to apply to block 408.

In block 410, a second model is initialised and weights in the second model are set based on corresponding weights in the first model (e.g. weights from the first model may be copied to the second model). Setting weights in the second model was described above with respect to system 100 and the details therein will be understood to apply equally to block 410.

The second model 404 is then trained on a first dataset in block 412. The training comprises updating a weight or weights in the second model (that were set based on the values of the corresponding weights in the first model). Because the second model 404 is solving a classification problem (e.g. whether a stent is present or not), the first dataset comprises classification training data. Training the second model on a first dataset was described above with respect to system 100 and the details therein will be understood to apply to block 404.

After training the second model, the method comprises adjusting a corresponding weight in the first model based on the updated weight(s) in the second model (block not shown in FIG. 4). In this way, the weights of the first and second model are each updated based on training of the other. It will be noted, that in this example, the annotations of the first and second datasets are different and thus the first dataset cannot be used to train the second model directly and the second dataset cannot be used to train the first model directly. However, because the first and second models are processing the same type of data and solving related problems, the insights (e.g. updated weights) gained during training can still be used to improve the weights of the other model. This enables each model to effectively be trained or gain insights from training data that the model could not otherwise use for training purposes itself. In this way, improved predictions can be obtained, even if the amount of training data for one of the models is insufficient to train that model alone.

After training the first 402 and second 404 models, they can be used to predict the location of a stent and classify whether a stent is present in blocks 414 and 416 respectively. Feedback from such predictions (e.g. feedback from a user as to the accuracy of the predictions) may be used to update (e.g. further train) the first model 402 and the second model 404 in blocks 418 and 420 respectively.

There is also provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java® interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system configured for training first and second neural network models, the system comprising:
   a memory comprising instruction data representing a set of instructions;
   a processor configured to communicate with the memory and to execute the set of instructions, wherein the set of instructions, when executed by the processor, cause the processor to:
      set a weight in the second model based on a corresponding weight in the first model;
      train the second model on a first dataset, wherein the training comprises updating the weight in the second model; and
      adjust the corresponding weight in the first model based on the updated weight in the second model by applying an increment to a value of the corresponding weight in the first model based on a difference between the corresponding weight in the first model and the weight in the second model.

2. The system as in claim 1, wherein the weight comprises a weight in one of:
   an input layer of the second model; and
   a hidden layer of the second model.

3. The system as in claim 1, wherein causing the processor to adjust the corresponding weight in the first model comprises causing the processor to:
   copy a value of the weight from the second model to the corresponding weight in the first model.

4. The system as in claim 1, wherein causing the processor to adjust the corresponding weight in the first model further comprises causing the processor to:
   set a weight in an output layer of the first model to an arbitrary value.

5. The system as in claim 1, wherein causing the processor to adjust the corresponding weight in the first model further comprises causing the processor to:
   maintain a value of at least one weight in an output layer of the first model at the same value.

6. The system as in claim 1, wherein causing the processor to set a weight in the second model comprises causing the processor to:
   copy a value of a weight from one of:
      an input layer of the first model; and
      a hidden layer of the first model,
   to a corresponding weight in the second model.

7. The system as in claim 1, wherein causing the processor to set a weight in the second model further comprises causing the processor to:
   set at least one weight in an output layer of the second model to an arbitrary value.

8. The system as in claim 1, wherein the first model comprises one of:
   an object detection model; and
   an object localization model;
   and wherein the second model comprises the other one of:
      an object detection model; and
      an object localization model.

9. The system as in claim 1, wherein the first model comprises one of:
   a model configured to produce a single output; and
   a model configured to produce a plurality of outputs;
   and wherein the second model comprises the other one of:
      a model configured to produce a single output; and
      a model configured to produce a plurality of outputs.

10. The system as in claim 1, wherein the set of instructions, when executed by the processor, further cause the processor to:
    adjust a weight in one of:
       the first model; and
       the second model;
    in response to further training of the other one of:
       the first model; and
       the second model.

11. The system as in claim 10, wherein the set of instructions, when executed by the processor, cause the processor to repeat the step of adjusting a weight, until one or more of the following criteria are met:
    the first model and/or the second model reach a threshold accuracy level;
    the magnitude of an adjustment falls below a threshold magnitude;
    said weight in the first model and its corresponding weight in the second model converge towards one another within a predefined threshold; and
    a loss associated with the first model and/or a loss associated with the second model changes by less than a threshold amount between subsequent adjustments.

12. The system as in claim 1, wherein the first model is trained on a second dataset, the first dataset comprising less data than the second dataset, wherein the size of the second dataset alone is insufficient to train the second model to a predefined accuracy with arbitrarily initiated weights.

13. A computer implemented method of training first and second neural network models, the method comprising:
   setting a weight in the second model based on a corresponding weight in the first model;
   training the second model on a first dataset, wherein the training comprises updating the weight in the second model; and
   adjusting the corresponding weight in the first model based on the updated weight in the second model,
   wherein the first model is trained on a second dataset, the first dataset comprising less data than the second dataset, wherein a size of the second dataset alone is insufficient to train the second model to a predefined accuracy with arbitrarily initiated weights.

14. A non-transitory computer readable medium comprising computer readable code embodied therein, the computer readable code being configured such that, on execution by a computer or processor, the computer or processor:
   sets a weight in a second model based on a corresponding weight in a first model;
   trains the second model on a first dataset, wherein the training comprises updating the weight in the second model; and
   adjusts the corresponding weight in the first model based on the updated weight in the second model,
   wherein the first model is trained on a second dataset, the first dataset comprising less data than the second dataset, wherein a size of the second dataset alone is insufficient to train the second model to a predefined accuracy with arbitrarily initiated weights.

15. The system as in claim 1, wherein the processor trains one of the first or second neural network models to detect a presence of a particular object in an image, and the processor trains another of the first or second neural network models to measure a length of a particular type of object in an image.

16. The system as in claim 1, wherein at least one of the first model and second model is a partially trained model.

17. The system as in claim 1, wherein the first model is a partially trained model.

18. The system as in claim 1, wherein both the first and the second models are partially trained models, and a model of the first and the second models is trained more than a second of the first and the second models.

19. The system as in claim 1, wherein the corresponding weight in the first model may be adjusted a percentage of the difference between the corresponding weight in the first model and the weight in the second model.

20. The system as in claim 1, wherein the second dataset comprises medical images annotated with x,y coordinates of a center of a bounding box drawn around tissue of interest.

* * * * *